United States Patent
Negro et al.

(10) Patent No.: US 10,068,153 B2
(45) Date of Patent: Sep. 4, 2018

(54) TRAINABLE HANDHELD OPTICAL CHARACTER RECOGNITION SYSTEMS AND METHODS

(71) Applicants: James A Negro, Arlington, MA (US); Carl W Gerst, Clifton, NY (US)

(72) Inventors: James A Negro, Arlington, MA (US); Carl W Gerst, Clifton, NY (US)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 14/885,065

(22) Filed: Oct. 16, 2015

(65) Prior Publication Data

US 2017/0024633 A1    Jan. 26, 2017

Related U.S. Application Data

(63) Continuation-in-part of application No. 14/521,508, filed on Oct. 23, 2014, which is a continuation of application No. 13/590,744, filed on Aug. 21, 2012, now Pat. No. 8,873,892.

(51) Int. Cl.
| | |
|---|---|
| *G06K 9/22* | (2006.01) |
| *G06K 9/62* | (2006.01) |
| *G06K 9/74* | (2006.01) |
| *H04N 5/232* | (2006.01) |
| *H04N 17/00* | (2006.01) |
| *H04N 5/225* | (2006.01) |

(52) U.S. Cl.
CPC .......... *G06K 9/6254* (2013.01); *G06K 9/228* (2013.01); *G06K 9/6217* (2013.01); *G06K 9/6255* (2013.01); *G06K 9/74* (2013.01); *H04N 5/23293* (2013.01); *H04N 5/23296* (2013.01); *H04N 17/002* (2013.01); *G06K 2209/01* (2013.01); *H04N 5/2256* (2013.01)

(58) Field of Classification Search
CPC .... G06K 2209/01; G06K 9/228; G06K 9/325; H04N 2201/0471
USPC ....... 382/103, 112, 113, 170, 175, 177, 313; 358/1.11, 505, 473, 474
See application file for complete search history.

(56) References Cited

U.S. PATENT DOCUMENTS

| | | |
|---|---|---|
| 2,448,562 A | 9/1948 | Way et al. |
| 4,210,802 A | 7/1980 | Sakai |
| 4,222,654 A | 9/1980 | Bodenhamer |

(Continued)

OTHER PUBLICATIONS

Brennan, Elaine and Allean Renear. "New Communication Media; Scanning." Humanist Discussion Group, vol. 3, No. 1337. May 1, 1990.

*Primary Examiner* — Yosef Kassa
(74) *Attorney, Agent, or Firm* — Quarles & Brady LLP

(57) ABSTRACT

A handheld scanner incorporates vision software to allow the handheld scanner to be trained for OCR. The handheld scanner can include a user interface to allow a user to associate an image of a mark with electronic data for the mark. The user interface, along with a range finder, can also be used to influence variables that affect the quality of an image scan, thereby improving the quality of results for the image scan and/or decode process. The handheld scanner can also use a font description file during the decode process. The font description file can be generated using a synthetic image file of a character. The synthetic image file can be created by interpreting a marker font file.

22 Claims, 7 Drawing Sheets

(56) References Cited

U.S. PATENT DOCUMENTS

| | | | |
|---|---|---|---|
| 4,288,690 A | 9/1981 | Sanner | |
| 5,140,146 A * | 8/1992 | Metlitsky | G06K 7/10881 235/462.26 |
| 5,191,199 A | 3/1993 | Elko | |
| 5,285,056 A | 2/1994 | Tedesco et al. | |
| 5,486,944 A | 1/1996 | Bard et al. | |
| 5,569,902 A | 10/1996 | Wood et al. | |
| 5,656,803 A | 8/1997 | Seo | |
| 5,675,149 A | 10/1997 | Wood et al. | |
| 5,747,785 A * | 5/1998 | Miller | B60R 11/02 235/472.01 |
| 5,748,904 A * | 5/1998 | Huang | G06T 9/005 345/544 |
| 5,786,586 A | 7/1998 | Pidhirny et al. | |
| 5,793,371 A * | 8/1998 | Deering | G06T 9/001 345/418 |
| 5,835,244 A * | 11/1998 | Bestmann | H04N 1/6025 358/515 |
| 5,905,251 A * | 5/1999 | Knowles | G06F 17/30879 235/462.01 |
| 6,000,612 A | 12/1999 | Xu | |
| 6,003,775 A * | 12/1999 | Ackley | G06K 7/1098 235/462.47 |
| 6,016,135 A * | 1/2000 | Biss | G06K 7/10881 345/179 |
| 6,045,047 A | 4/2000 | Pidhirny et al. | |
| 6,104,845 A | 8/2000 | Lipman et al. | |
| 6,223,291 B1 | 4/2001 | Puhl et al. | |
| 6,246,925 B1 | 6/2001 | Robinson et al. | |
| 6,529,645 B2 | 3/2003 | Fahraeus et al. | |
| 6,556,315 B1 | 4/2003 | Kommrusch et al. | |
| 6,624,881 B2 * | 9/2003 | Waibel | G01C 3/08 356/3.01 |
| 6,707,851 B1 * | 3/2004 | Choi | G06T 7/0083 375/240.01 |
| 6,813,501 B2 | 11/2004 | Kinnunen et al. | |
| 6,901,166 B1 | 5/2005 | Nakayama | |
| 6,969,004 B2 * | 11/2005 | Ralph | A47F 9/04 235/462.25 |
| 6,978,930 B2 * | 12/2005 | Harding | G06Q 20/343 235/375 |
| 7,128,270 B2 | 10/2006 | Silverbrook et al. | |
| 7,130,654 B2 * | 10/2006 | Cho | H04M 1/0258 455/550.1 |
| 7,180,607 B2 | 2/2007 | Kyle et al. | |
| 7,194,200 B1 | 3/2007 | Behlow | |
| 7,195,167 B2 * | 3/2007 | Lucera | G06K 7/1098 235/462.25 |
| 7,233,990 B1 | 6/2007 | Debaty et al. | |
| 7,260,261 B2 | 8/2007 | Xie et al. | |
| 7,284,046 B1 | 10/2007 | Kreiner et al. | |
| 7,296,748 B2 * | 11/2007 | Good | G06K 47/10693 235/462.14 |
| 7,309,011 B2 * | 12/2007 | He | G06K 7/10732 235/385 |
| 7,342,650 B2 * | 3/2008 | Kern | G01C 1/04 356/5.02 |
| 7,459,713 B2 * | 12/2008 | Coates | G01J 3/02 250/239 |
| 7,510,118 B2 * | 3/2009 | Ralph | A47F 9/04 235/462.01 |
| 7,570,816 B2 | 8/2009 | Bargeron et al. | |
| 7,588,188 B2 | 9/2009 | Knowles et al. | |
| 7,600,687 B2 * | 10/2009 | Biss | G06K 7/089 235/454 |
| 7,610,045 B2 | 10/2009 | Little et al. | |
| 7,611,064 B2 * | 11/2009 | Zhu | G06F 9/44526 235/462.41 |
| 7,621,455 B2 * | 11/2009 | Tsikos | B82Y 15/00 235/462.42 |
| 7,661,597 B2 | 2/2010 | Knowles et al. | |
| 7,690,574 B2 * | 4/2010 | Rathus | B42D 3/123 235/375 |
| 7,717,344 B2 * | 5/2010 | Rathus | G06Q 30/02 235/375 |
| 7,740,175 B2 * | 6/2010 | Good | G06K 7/10693 235/462.04 |
| 7,869,005 B2 * | 1/2011 | Ossig | G01C 15/002 356/3.01 |
| 7,897,923 B2 | 3/2011 | Shelley et al. | |
| 7,907,282 B2 | 3/2011 | Coates | |
| 8,014,604 B2 | 9/2011 | Tzadok et al. | |
| 8,027,505 B2 * | 9/2011 | Edgar | A45D 44/005 347/1 |
| 8,027,802 B1 | 9/2011 | Nadabar et al. | |
| 8,069,289 B2 | 11/2011 | Hafer et al. | |
| 8,081,849 B2 * | 12/2011 | King | G06K 9/228 382/305 |
| 8,103,259 B2 | 1/2012 | Gravel | |
| 8,175,335 B2 | 5/2012 | Zhang et al. | |
| 8,251,279 B2 | 8/2012 | Lyon et al. | |
| 8,279,430 B2 | 10/2012 | Dold et al. | |
| 8,313,030 B2 * | 11/2012 | Zolotov | G06K 7/10722 235/462.01 |
| 8,926,647 B2 * | 1/2015 | Alferness | A61B 17/12022 128/200.24 |
| 2008/0260210 A1 | 10/2008 | Kobeli et al. | |
| 2011/0128373 A1 | 6/2011 | Goldberg | |
| 2012/0281087 A1 | 11/2012 | Kruse | |

* cited by examiner

TRAINABLE HANDHELD OPTICAL CHARACTER RECOGNITION SYSTEMS AND METHODS

CROSS-REFERENCE TO RELATED APPLICATIONS

This application is a continuation-in-part of co-pending U.S. patent application Ser. No. 14/521,508, filed Oct. 23, 2014, and entitled "Trainable Handheld Optical Character Recognition Systems and Methods," which is a continuation of U.S. patent application Ser. No. 13/590,744, filed Aug. 21, 2012, now U.S. Pat. No. 8,873,892 dated Oct. 28, 2014, and entitled "Trainable Handheld Optical Character Recognition Systems and Methods," all of which are hereby incorporated by reference.

STATEMENT REGARDING FEDERALLY SPONSORED RESEARCH OR DEVELOPMENT

Not applicable.

BACKGROUND OF THE TECHNOLOGY

The present technology relates to imaging systems, and more specifically, to a handheld scanner with trainable optical character recognition functionality.

Optical imaging systems that incorporate optical character recognition (OCR) are used for reading fonts and other symbols on packages or articles, for example. One of the most common of these imaging systems is the handheld scanner. OCR is generally considered as an electronic conversion of scanned images of handwritten, typewritten or printed text into machine-encoded text. It is important for imaging systems to achieve a quality scan so the image can be electronically searched, stored more compactly, displayed on-line, and used in machine processes such as machine translation, text-to-speech and text mining applications.

In order to improve scanning results, some optical imaging systems utilize standardized machine readable fonts, such as OCR-A and OCR-B, which were created to make the OCR process more accurate. The standardized font made decoding the font in an image far less complicated because the imaging system was made aware of the simplified fonts it was attempting to scan, and the individual characters in the fonts were designed to be easily distinguishable. For example the numeral "zero" contains a slash in order to help discriminate it from the alphabetical "o" (lower case) and "0" (uppercase). Nevertheless, many imaging applications, especially those where a handheld scanner is desired to scan an object or article, do not use standardized fonts.

Some modern OCR systems can be "trained" to recognize alternate fonts and other symbols. Yet, the training process is a complicated and time consuming process where each font and/or symbol must be scanned and then manually associated with the desired electronic character or data. The training process involves use of a computer where a user can view scanned images and match the image to the desired data. Once all the fonts or symbols are associated with the desired data, an electronic file with all the association data can be generated and can then be transferred to the imaging system for use by the imaging system to improve the results of a scan.

There are current handheld scanners that have limited OCR functionality; yet, these current handheld scanners require pre-configured machine readable fonts, such as OCR-A and OCR-B. Training current handheld scanners on alternate fonts or symbols is not an option because the handheld scanners do not have the processing power and user interface to provide the association between fonts and symbols and the desired data. In addition, as with any imaging device, providing quality results for each image scan can be difficult taking into consideration the numerous variables that affect the quality of an image scan.

What is needed are systems and methods that allow a handheld scanner to be trained on alternate fonts and/or symbols. What is also needed are systems and methods that can improve the quality of results for each image scan by influencing the variables that affect the quality of an image scan.

BRIEF SUMMARY OF THE TECHNOLOGY

The present embodiments overcomes the disadvantages of the prior art by incorporating vision software with a handheld scanner to allow the handheld scanner to be trained for OCR. In some embodiments, the handheld scanner can include a user interface to allow a user to associate an image of a mark with electronic data for the mark. The user interface, along with a range finder, can also be used to influence variables that affect the quality of an image scan, thereby improving the quality of results for an image scan and/or decode process. In other embodiments, the handheld scanner can use a font description file during the decode process. In some embodiments, the font description file can be generated using a synthetic image file of a character. The synthetic image file can be created by interpreting a marker font file. In other embodiments, the handheld scanner can use a font description file generated by interpreting a marker font file.

Accordingly, some embodiments comprise a handheld scanner. The handheld scanner includes a scanner subassembly. The scanner subassembly can include a vision sensor, a processor coupled to the vision sensor, and memory coupled to the processor. A user interface can be coupled to the scanner subassembly, the user interface including a visual display for viewing a live image of at least a portion of a mark to be scanned, the visual display including a region of interest viewable on the visual display, the region of interest to enable a user to position the handheld scanner for optimal X-Y position of the handheld scanner. And, vision software can be executable by the processor, the vision software operable to digitally interpret a marker font file to decode a subsequent image of the mark, the marker font file describing the mark.

Other embodiments comprise a handheld scanner. The handheld scanner includes a scanner subassembly. The scanner subassembly can include a vision sensor, a processor coupled to the vision sensor, and memory coupled to the processor. A range finder can be coupled to the scanner subassembly, the range finder extending from a face of the scanner subassembly a predetermined distance, the predetermined distance to provide an optimal working distance for a scan, the range finder extending off of the face of the scanner subassembly substantially parallel to an optical axis of the vision sensor. And, vision software can be executable by the processor, the vision software operable to digitally interpret a marker font file to decode a subsequent image of the mark, the marker font file describing the mark.

Yet other embodiments comprise a handheld scanner. The handheld scanner includes a scanner subassembly. The scanner subassembly can include a vision sensor, a processor coupled to the vision sensor, and memory coupled to the processor. A user interface can be coupled to the scanner subassembly, the user interface including a visual display for viewing a live image of at least a portion of a mark to be scanned, the visual display including a region of interest viewable on the visual display, the region of interest to enable a user to position the handheld scanner for optimal X-Y position of the handheld scanner. A range finder can be coupled to the handheld scanner subassembly, the range finder extending from a face of the scanner subassembly a predetermined distance, the predetermined distance to provide an optimal working distance for a scan, the range finder extending from the face of the scanner subassembly substantially parallel to an optical axis of the vision sensor. And, vision software can be executable by the processor, the vision software operable to digitally interpret a marker font file to decode a subsequent image of the mark, the marker font file describing the mark.

Consistent with the above, some embodiments include a method for scanning a mark on an object. The method includes providing a handheld scanner, the handheld scanner including a vision sensor, a processor coupled to the vision sensor, memory coupled to the processor, a user interface and a range finder; enabling a visual display on the user interface, the visual display for viewing a live image of at least a portion of the mark; observing the visual display while moving the handheld scanner so the visual display displays the live image of the at least a portion of the mark; positioning the live image of the at least a portion of the mark near to or within a region of interest viewable on the visual display for alignment feedback; positioning the handheld scanner so a distal end of the range finder touches or is substantially near the object; and digitally executing the vision software for interpreting a marker font file and for decoding a subsequent image of the mark, the marker font file describing the mark.

In some embodiments, the method can further include digitally executing the vision software for digitally associating the marker font file with desired electronic data and for generating a font description file, the font description file usable for decoding the subsequent image of the mark.

In some embodiments, digitally associating further includes using the user interface for associating the electronic image of the mark with the desired electronic data.

In some embodiments, the method can further include digitally interpreting the marker font file for creating a synthetic image file.

In some embodiments, the method can further include digitally associating the synthetic image file with the desired electronic data for generating the font description file.

In some embodiments, the method can further include enabling a trigger on the handheld scanner for enabling the visual display.

In some embodiments, the method can further include releasing a trigger on the handheld scanner for enabling the scan of the mark.

In some embodiments, the method can further include decoding the image of the mark, and displaying the decoded mark on the display screen.

In some embodiments, the method can further include positioning the live image of the mark near to or within a region of interest viewable on the visual display; positioning the handheld scanner so a distal end of the range finder touches or is substantially near the object; enabling a second scan of the mark to generate a second electronic image of the mark; accessing the font description file stored in the memory; and decoding the second electronic image of the mark using the accessed font description file.

To the accomplishment of the foregoing and related ends, the technology, then, comprises the features hereinafter fully described. The following description and the annexed drawings set forth in detail certain illustrative aspects of the technology. However, these aspects are indicative of but a few of the various ways in which the principles of the technology can be employed. Other aspects, advantages and novel features of the technology will become apparent from the following detailed description of the technology when considered in conjunction with the drawings.

Figure 1:
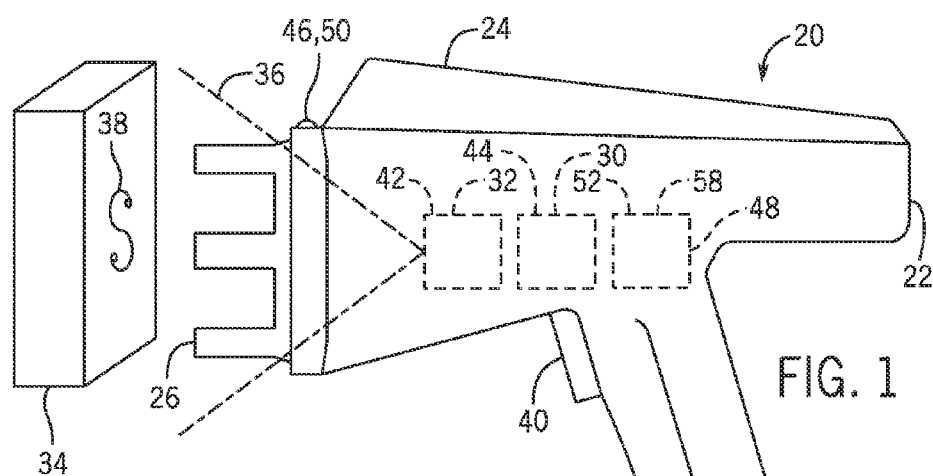
FIG. 1 is a schematic view of one embodiment of a handheld scanner in accordance with the present embodiments, and showing an optional computer usable for OCR functionality.

While the technology is susceptible to various modifications and alternative forms, specific embodiments thereof have been shown by way of example in the drawings and are herein described in detail. It should be understood, however, that the description herein of specific embodiments is not intended to limit the technology to the particular forms disclosed, but on the contrary, the intention is to cover all modifications, equivalents, and alternatives falling within the spirit and scope of the technology as defined by the appended claims.

DETAILED DESCRIPTION OF THE TECHNOLOGY

The various aspects of the subject technology are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," "device" and the like are intended to refer to either hardware, a combination of hardware and software, software, or software in execution. The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques and/or programming to produce hardware, firmware, software, or any combination thereof to control an electronic based device to implement aspects detailed herein.

Unless specified or limited otherwise, the terms "connected," and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically.

As used herein, the term "processor" may include one or more processors and memories and/or one or more programmable hardware elements. As used herein, the term "processor" is intended to include any of types of processors, CPUs, microcontrollers, digital signal processors, or other devices capable of executing software instructions.

As used herein, the term "memory medium" includes a non-volatile medium, e.g., a magnetic media or hard disk, optical storage, or flash memory; a volatile medium, such as system memory, e.g., random access memory (RAM) such as DRAM, SRAM, EDO RAM, RAMBUS RAM, DR DRAM, etc.; or an installation medium, such as software media, e.g., a CD-ROM, or floppy disks, on which programs may be stored and/or data communications may be buffered. The term "memory medium" may also include other types of memory or combinations thereof.

Embodiments of the technology are described below by using diagrams to illustrate either the structure or processing of embodiments used to implement the embodiments of the present technology. Using the diagrams in this manner to present embodiments of the technology should not be construed as limiting of its scope. The present technology contemplates both an electronic device configuration and systems and methods for training a handheld optical character recognition system.

The various embodiments of an imaging system will be described in connection with a handheld scanner adapted to be trained to perform OCR on custom and alternate fonts, and any other symbols. That is because the features and advantages of the technology are well suited for this purpose. Still, it should be appreciated that the various aspects of the technology can be applied in other forms of imaging systems that may benefit from OCR functionality.

Referring now to FIG. 1, one exemplary embodiment will be described in the context of a handheld scanner 20 that includes, among other components, a scanner subassembly 22, a user interface 24, and an optional range finder 26. The exemplary handheld scanner 20 can be used in a warehousing, manufacturing, assembly, automation, and/or control application, among others, as non-limiting examples. The exemplary handheld scanner 20 can use image acquisition software 30 operable to perform any of various types of image acquisitions. The handheld scanner 20 can perform machine vision tasks including scanning and decoding images containing fonts and/or symbols, as non-limiting examples.

Referring still to FIG. 1, the scanner subassembly 22 can include a variety of components that are used in the scanning process. For example, scanner subassembly 22 can include a vision sensor 32. The vision sensor 32 serves to convert reflected light from an object 34 and associated mark 38 (shown as a stylized "S") on the object into electrons to create an electronic image 48 of the mark 38 in the field of view (FOV) 36 when a trigger 40 is pulled or released. In some embodiments, a lens assembly 42 can be positioned over or in front of the vision sensor 32 to provide a view of the object 34 in the FOV 36 to the vision sensor 32.

Scanner subassembly 22 can also include a processor 44 used for image processing and decoding, for example. The processor 44 is coupled to the vision sensor 32, and can either be part of the vision sensor 32, or it can be locally linked to the vision sensor 32. The processor 44 can be encoded with the image acquisition software 30 that can be configured to, among other things, control illumination, acquire image data, and process/decode the acquired image data into usable information. Processor 44 can also be coupled to one or more visual feedback devices 46 and/or one or more audio feedback devices 50 to provide feedback to a user indicating the results of the scan and/or decode process (e.g., whether or not the quality of the imaged mark meets or exceeds a baseline quality assessment value). For example, visual feedback devices 46 may include lights or light emitting diodes 46 and the audio feedback device 50 may include a small speaker or beeper device 50. In at least some cases, different LED colors may be used to indicate whether or not the mark quality passes the baseline value test (e.g., a green LED may indicate high mark quality while a red LED indicates a mark that failed a quality test).

Scanner subassembly 22 can also include a memory medium 52 coupled to the vision sensor 32 and/or the processor 44. The memory medium can be used for storing scanned or processed images 48, font description files 58, marker font files 170, and buffering data and communications, and the like. A communication port 54 can also be coupled to the processor 44, and provide a connection point to an optional computer 56. The computer 56 can be used for uploading and downloading scanned or processed images 48, font description files 58, and marker font files 170, for example. It is to be appreciated that wireless communications are also contemplated.

Figure 2:
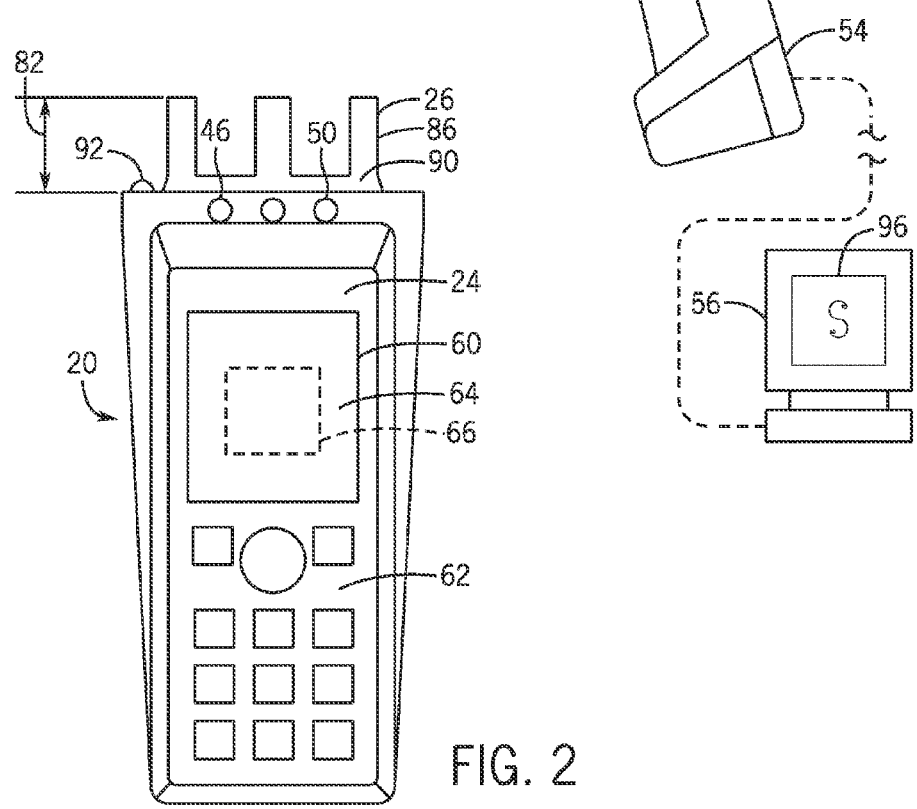
FIG. 2 is a top view of the handheld scanner as seen in FIG. 1.

Referring to FIG. 1, and also FIG. 2, the handheld scanner 20 can also include a user interface 24 to allow a user to affect the quality of the results from a scan. In some embodiments, the user interface can comprise a small portable data terminal or similar device running the Microsoft Windows CE platform, for example.

The user interface 24 can include a display screen 60 and a keyboard 62, and can be integral with the scanner subassembly 22, or can be a removable device that can operatively couple to the scanner subassembly 22. In some embodiments, the display screen 60 can include touch screen functionality, eliminating or reducing the number of keys that may be included with the keyboard 62. The display screen 60 provides a live feedback view 64 of what is in at least a portion of the FOV 36 of the handheld scanner 20.

The exemplary display screen 60 can include a region of interest (ROI) area 66 outlined or otherwise visible to the user on the display screen 60. The live feedback view 64 and ROI 66 allows the user to manually affect at least one imaging variable to improve the quality of the results from a scan by allowing the user to generally see a live image of what the vision sensor 32 is seeing in the FOV 36, and to reposition the handheld scanner 20 so the desired mark 38 is optimally positioned within the ROI 66 for a scan. The live feedback view 64 can be enabled when the trigger 40 is pulled, or optionally, the live feedback view 64 can be enabled when the handheld scanner 20 is powered on and ready to scan, for example.

Figure 3:
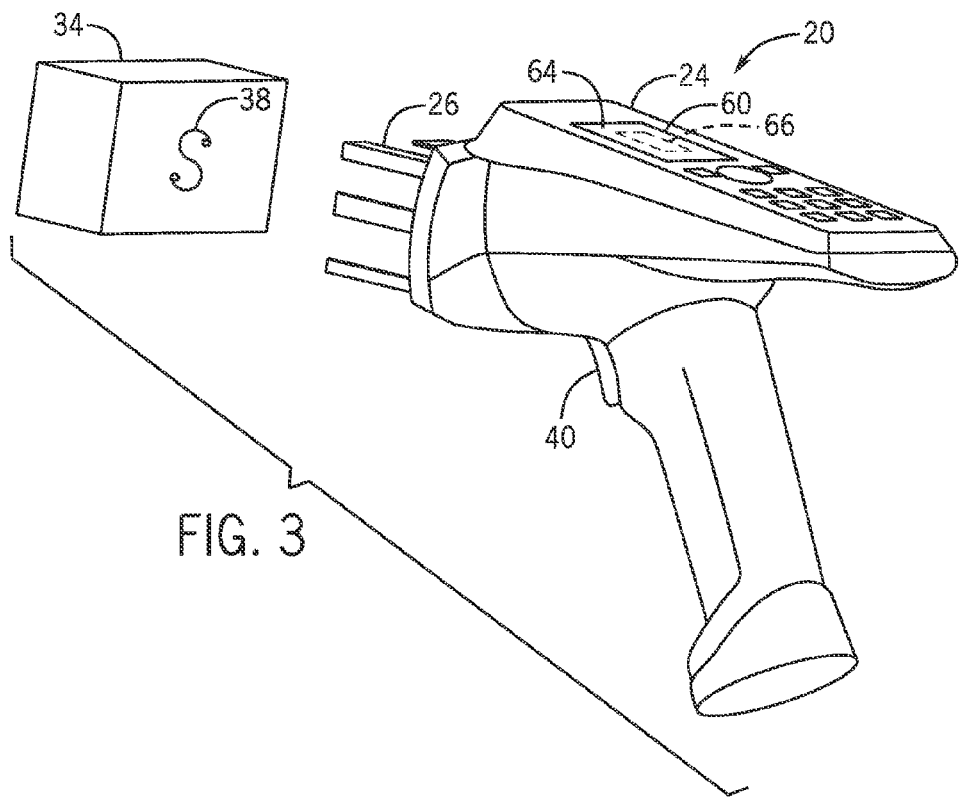
FIG. 3 is a perspective view of the handheld scanner as seen in FIG. 1, and showing the handheld scanner in a position prior to scanning an object.

Referring to FIG. 3, a user would position the handheld scanner 20 a certain distance away from the object 34 and associated mark 38 to be scanned. In some embodiments, the user would then engage the trigger 40 to allow the display screen 60 to display the live feedback view 64. The ROI 66 can generally be permanent on the display screen 60, such as with an overlay, or the ROI 66 can be an adjustable image where the height and width can be adjusted for specific applications, and displayed on the display screen 60 along with the live feedback view 64. It is to be appreciated that the ROI 66 need not be a square, as shown, but can be any indication on the display screen 60 that would allow a user to reposition the handheld scanner 20 to improve the quality of the results from a scan. For example, a circle, an "X", a dot, or arrows, or any combination, can be used.

Figure 4:
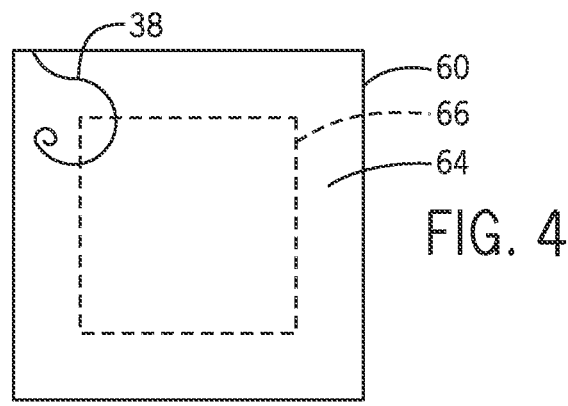
FIG. 4 is a view of a display screen from a handheld scanner in accordance with the present embodiments, and showing a mark on an object in partial view and only a portion of the mark being within a region of interest.
Figure 5:
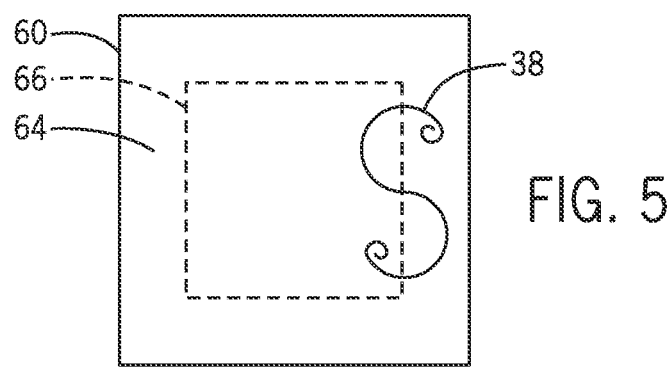
FIG. 5 is a view of the display screen as seen in FIG. 4, and now showing the mark in full view yet with still only a portion of the mark being within the region of interest.
Figure 6:
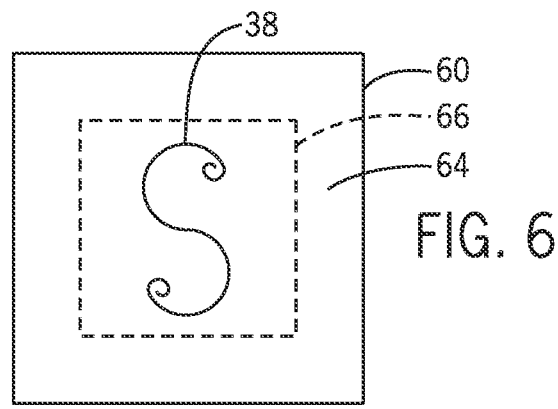
FIG. 6 is a view of the display screen as seen in FIG. 5, and now showing the mark in full view and with the mark being within the region of interest.

Referring to FIG. 4, an exemplary view of a display screen 60 is shown where the mark 38 is partially within the FOV 36 of vision sensor 32 and is therefore partially displayed on the display screen 60. The user, in seeing the mark 38 only partially displayed, can then adjust the position of the handheld scanner 20 in an attempt to reposition the handheld scanner 20 (or reposition the mark 38) so the mark 38 is within the ROI 66. FIG. 5 shows an example where the mark 38 is within the FOV 36 and is partially with the ROI 66. In some embodiments, the mark 38 could be scanned at this point. To improve the quality of the results from the scan, the user could further reposition the handheld scanner 20 (or reposition the mark 38) so the mark 38 is substantially or completely within the ROI 66. FIG. 6 shows a view of the display screen 60 where the mark 38 is completely within the ROI 66.

In some embodiments, the visual feedback device 46 and/or the audio feedback device 50 can be used to provide feedback to a user indicating a position of the mark 38, e.g., the mark is partially or completely within the ROI.

Figure 7:
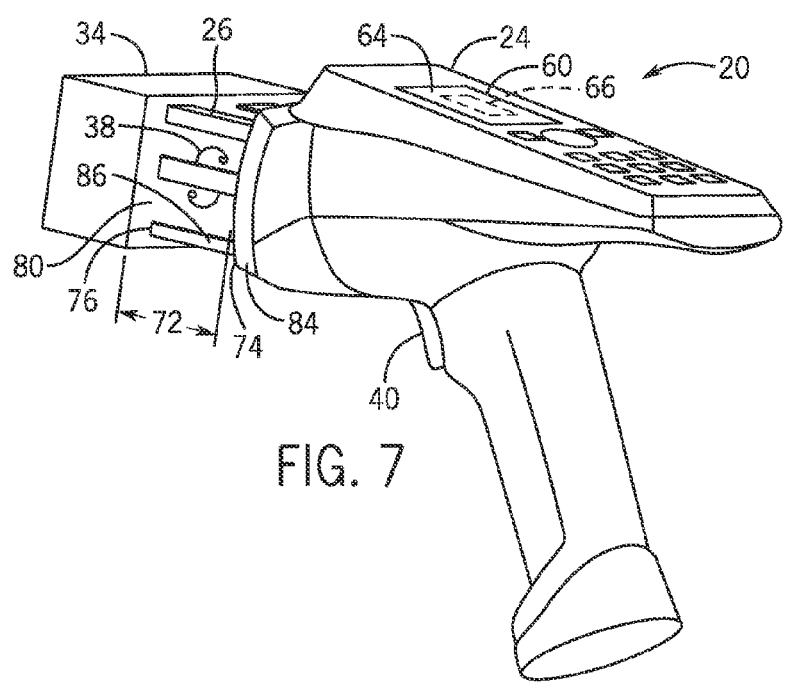
FIG. 7 is a perspective view of the handheld scanner as seen in FIG. 3, now being in a scanning position with a predetermined distance from the object to the handheld scanner.

Referring now to FIG. 7, an embodiment of the handheld scanner 20 can include a range finder 26. The range finder 26 can also serve to improve the quality of the results from the scan, alone, or in combination with the display screen 60 and associated ROI 66. When using a traditional handheld scanner, uncertainty is inherently introduced in a mark scan by the physical position of the object 34 and associated mark 38 in relation to the handheld scanner. The display screen 60 and associated ROI 66 improve the X-Y position of one or both of the handheld scanner 20 and the mark 38, and offer some improvement in the Z position or working distance, while the use of the range finder 26 can position the handheld scanner 20 for optimal working distance and scale, while also aiding in the X-Y position.

In embodiments with the range finder 26, results of a scan can be improved provided the handheld scanner 20 is a predetermined optimal distance 72 from the object 34 and associated mark 38 to be scanned so that the image is generally in focus without requiring the processor 44 to perform extensive calculations in an attempt to improve the focus of the mark 38. The optimal working distance is important to determine the scale of the mark in the image and to insure a sufficient focus. In other embodiments, lens assembly 42 can be a constant focus or "zoom" lens assembly 42 that can be used to provide constant magnification for a wide range of working distances.

In the embodiment shown, the range finder 26 includes a plurality of fingers 86 extending from a base 90 (see FIG. 2). In this configuration, the mark 38 can remain visible to a user that may be looking at the mark 38 on the object 34. In other embodiments, the range finder 26 may be more tubular or rectangular in shape without any gaps as provided by the fingers 86, thereby partially or substantially reducing the user's ability to visualize the actual mark 38 on the object 34.

As shown in FIG. 7, the range finder 26 can extend from a front end face 74 of the handheld scanner 20. The range finder 26 can be a rigid member that extends along a trajectory that is substantially parallel to a central trajectory (not shown) of the FOV 36. In operation, a user can position the handheld scanner 20 so that a distal end 76 of the range finder 26 contacts a first surface 80 of the object 34 adjacent to the mark 38 to be read prior to activating the handheld scanner 20. Here, the length 82 of the range finder 26 (see FIG. 2) is designed so that the optimal imaging distance 72 occurs between the handheld scanner 20 and first surface 80 when distal end 76 contacts the first surface 80. Thus, range finder 26 also can help to eliminate or reduce at least one imaging variable in at least some embodiments.

Referring still to FIG. 7, while the range finder 26 is shown as rigid and integrally formed with the handheld scanner 20, in some embodiments, the range finder 26 can be flexible, can be telescoping like a radio antenna, and can fold into a storage position, for example. In some embodiments, the range finder 26 can be removable. For instance, range finder 26 can attach at the front face 74 using a clip or collar 84 or the like that couples to the front face 74 of the handheld scanner 20. The range finder 26 can also be made of a diffusive material, thereby taking advantage of lighting options available with the handheld scanner 20. The illumination from the handheld scanner 20 can then pass through the diffusive material and provide additional diffuse illumination benefits to improve the quality of the results from a scan.

In some embodiments, a measurement device 92, such as a known LED or laser diode 92 for distance measurements, can be included in combination with the range finder 26 or in place of the range finder (see FIG. 2). The laser diode 92 can operate in unison with the display screen 60 to provide an indication when an optimal working distance is reached. The measurement device 92 can function as a range finder, such as a time of flight laser range finder. The measurement device 92 can be used to determine the distance to the mark 38 used for training and the distance to the mark 38 used for scanning. Scale differences between training and scanning configurations could then be known and the magnification can be compensated by standard machine vision techniques, such as resizing the image, or compensating for scale in an OCR algorithm.

Referring back to FIG. 1, the handheld scanner 20 can be trained to perform OCR on custom and alternate fonts, and any other symbols. In this way, a user is able to control what fonts and symbols the handheld scanner 20 is able to accurately scan and decode.

A problem with current handheld scanners is that they are limited to scanning standardized machine readable fonts such as known character sets OCR-A and OCR-B, and are not able to be trained to the user's requirements. These known character sets were designed to be easily read and recognized. The current handheld scanners are not able to read custom and alternate fonts and other symbols that can be printed using different printing methods, such as dot matrix, thermal transfer, ink-jet, and laser marking, and they are not able to read characters that are printed on consumer items, such as a bag of potato chips. These scanning applications frequently involve non-typical reading conditions, including varying light, varying depth of field, various printing methods, and varying angular reads. These conditions present problems that are not resolved in current OCR capable handheld scanners. In some embodiments, the incorporation of the display screen 60 and the range finder 26 with the trained handheld scanner 20 to recognize fonts and symbols addresses these non-typical reading conditions.

To train the handheld scanner 20, in some embodiments, a computer 56 may be used to create a font description file 58 that associates an image region with a character. The image region can be any shape, and can contain a block of pixels that looks like a character, or any predefined shape, such as the character "S", as a non-limiting example. The handheld scanner 20 can be used to acquire an electronic image 48 of a character, e.g., mark 38. The image 48 can be downloaded to the computer 56 where vision software 96, such as In-Sight® Explorer software from Cognex Corporation, can be used to associate the image 48 with a font. Once the font description file 58 is created, the font description file 58 can be uploaded to memory 52 in the handheld scanner 20. The handheld scanner 20 can then be configured to read the font description file 58, which allows the handheld scanner 20 to scan and decode the font.

In an alternative embodiment, the computer 54 can be eliminated and the association process and font description file 58 generation can take place on the handheld scanner 20. The user interface 24 or memory medium 52 can include the vision software 96 and the keyboard 62 can include sufficient functionality to complete the association process.

Figure 8:
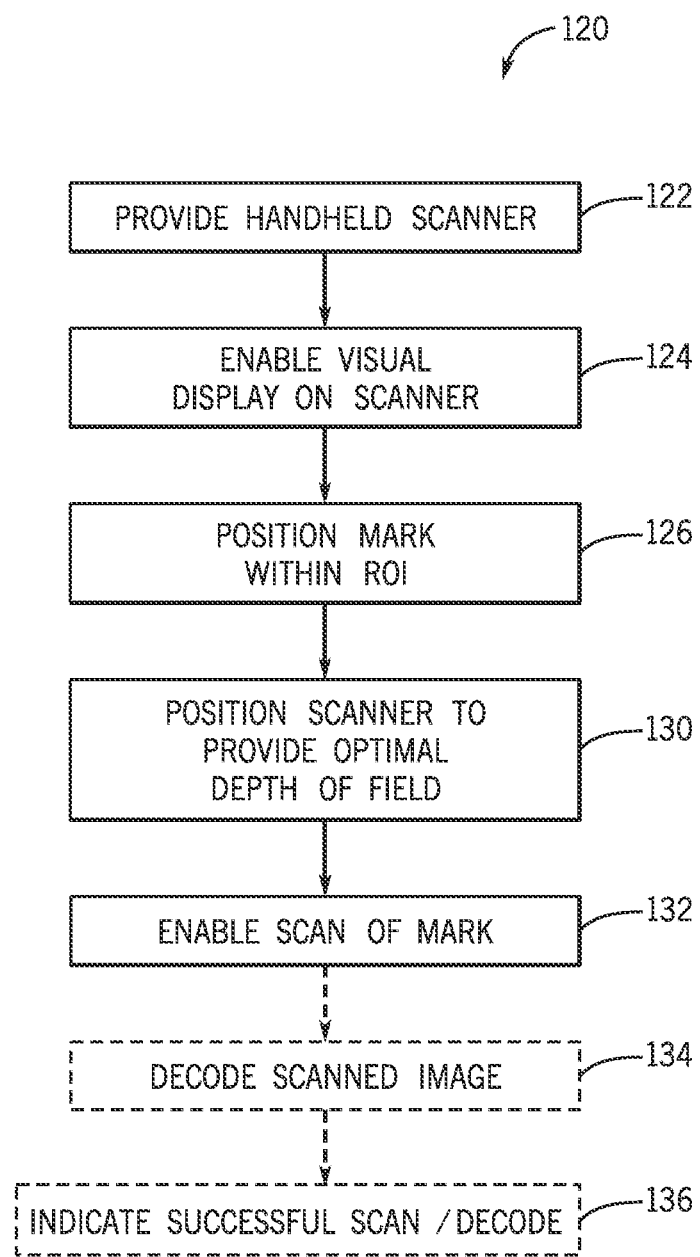
FIGS. 8 and 9 are flow charts of methods associated with the handheld scanner.
Figure 9:
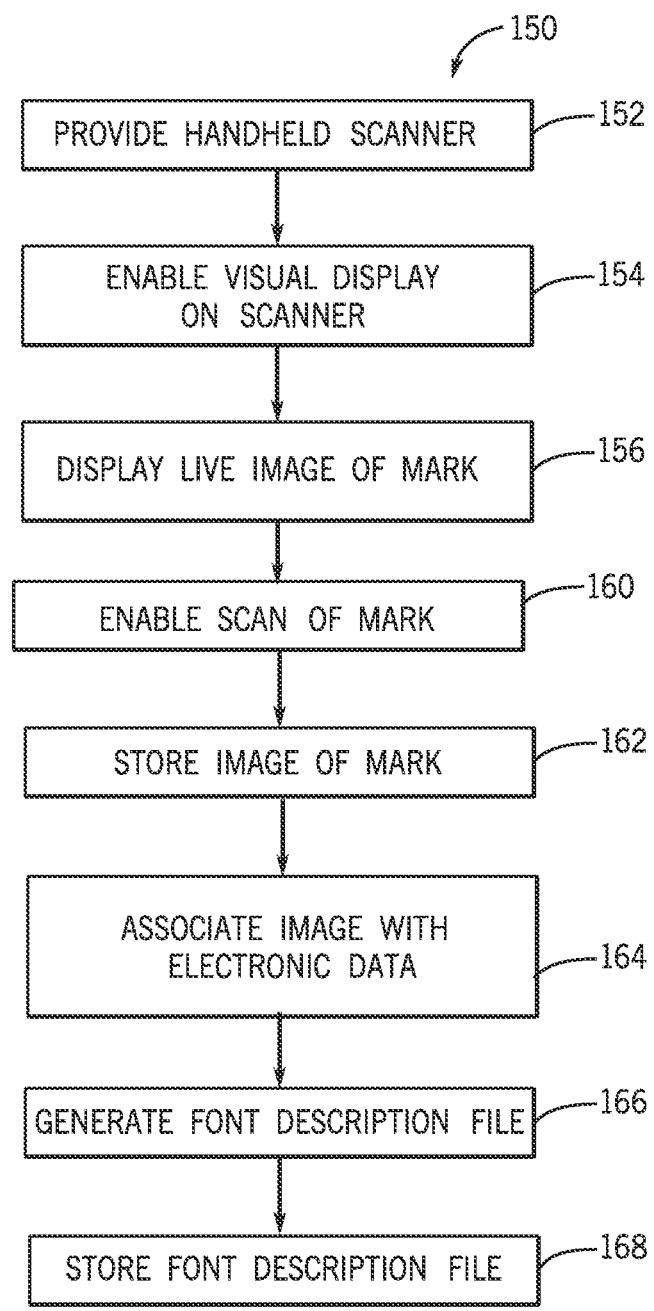
Figure 12:
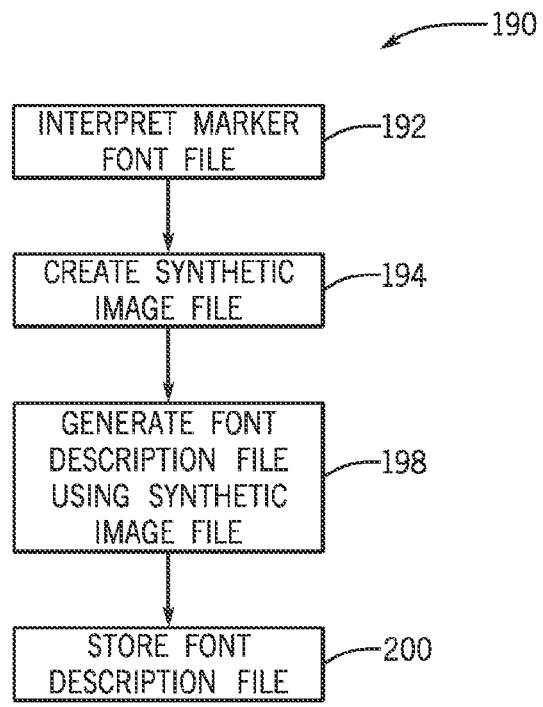
FIG. 12 is a flow chart of a method associated with training a handheld scanner.

FIGS. 8, 9, and 12 illustrate embodiments of methods for use of a handheld scanner 20. The methods shown in FIGS. 8, 9, and 12 may be used in conjunction with any of the systems or devices shown in the above Figures, among others. In various embodiments, some of the method elements shown may be performed concurrently, in a different order than shown, or may be omitted. Additional method elements may also be performed as desired.

Referring to FIG. 8, a method 120 is shown for scanning a mark 38 on an object 34. A first step can be to provide a handheld scanner 20 including a user interface 24 and a range finder 26, as indicated at process block 122. At process block 124, a user can squeeze the trigger 40 to enable the visual display 60. At process block 126, the user can then observe the visual display 60 while moving the handheld scanner 20 so as to position the mark 38 as reasonably possible near to or within the ROI 66. The user can then position the handheld scanner 20, at process block 130, such that the distal end 76 of the range finder 20 touches or is substantially near the first surface 80 of the object 34 and the mark 38 to provide the optimal working distance for the scan. It is to be appreciated that the handheld scanner 20 may already be at this optimal distance position. When the user has the mark 38 positioned within the ROI 66 (see FIG. 7), and the distal end 76 of the range finder 26 touches the object 34, at process block 132, the user releases the trigger 40 to enable the scan. Optionally, at process block 134, the processor 44 can then decode the scanned image. Optionally, as indicated at process block 136, the handheld scanner 20 can provide an indication of a successful image scan and/or decode by enabling one or more feedback devices 46, 50, and/or by displaying the decoded image on the display screen 60 for the user to see. The process can then be repeated for the next mark to be scanned.

Referring to FIG. 9, a method 150 of training a handheld scanner 20 for OCR of a mark 38 is shown. A first step can be to provide a handheld scanner 20 including memory 52 and a user interface 24, as indicated at process block 152. At process block 154, a visual display 60 on the user interface 24 can be enabled. The visual display 60 can be for viewing a live image of the mark 38. At process block 156, the user can then observe the visual display 60 while moving or positioning the handheld scanner 20 so the visual display 60 displays the live image of the mark 38. At process block 160, a scan of the mark 38 can be enabled to generate an electronic image of the mark. The electronic image of the mark 38 can then be stored in the memory 52, as indicated at process block 162. Next, at process block 164, the electronic image of the mark 38 can be associated with the desired electronic data. A font description file 58 can then be generated that associates the electronic image with the desired electronic data, as indicated at process block 166, and at process block 168, the font description file 58 can be stored in the memory 52.

In other embodiments, the font description file 58 can be generated directly or indirectly from a marker font file 170. The marker font file 170 can be a software based description 172 of how one or more of a set of characters is printed using a particular marking technology. The character set can include some or all alphanumeric characters, as a non-limiting example (see mark 38, as an example of the stylized letter "S"), or other predefined sets of characters.

As discussed above, there exist many types of character marking technologies, including dot matrix, thermal transfer, ink-jet, and laser marking, as non-limiting examples. There are numerous vendors of markers, including printers, which are able to mark an item using any of these technologies. Some companies offer a variety of products that use a variety of marking technologies, while other companies specialize in a single marking technology. With the variety of marking technologies and numerous companies using these technologies, there are few format standards in the marker industry for a marker font file 170.

Some marker font files can map directly to how a specific mark 38 should look after printing, and other marker font files don't map directly to how the specific mark should look after printing.

One example of a marking technology that maps directly is the thermal printing process, which can print at greater than 600 dots per inch (dpi). The thermal printing technology often uses a TrueType or other similar scalable marker font file, and there are other known formats specific to vendors and marking technologies. A marker font file 170 for a thermal printing process can be a software description that mathematically describes the contours of the specific mark 38 that can then be scaled and rendered by a printer.

An example of a marking technology that does not typically map directly is the laser marking technology. Laser marking can create marks in one of several different ways. A marker, such as a laser printer, using laser marking technology can burn away an outer layer leaving the layer beneath visible. Laser marking can char a surface or surfaces with organic compounds creating a contrast difference with surrounding areas. Laser marking can also modify the material properties, such as by melting plastic or metal, which in turn can create a change in reflectivity. A marker font file 170 for laser marking can be a software description of how the laser will be directed, usually by controlling the tilt of a mirror, to create the specific mark 38. A simple marker font file 170 for laser marking can model the mark 38 as a series of laser strokes that can render the mark 38 on a surface, for example.

Another common marking technology is continuous inkjet or CIJ. CIJ printers shoot a stream of ink drops at a steady rate. These ink drops are electrically charged and the trajectory of the charged drops is modified by passing the charged drops between plates with a controlled electrical charge. To form a specific mark, the ink-drops are typically applied in a single line with position being determined by the electrical charge on the ink drop and the electrical charge on the plates. The second dimension of the mark 38 comes from the motion of the object being printed on by the printer. A marker font file 170 for CIJ marking can be a software description that defines a two-dimensional idealized grid of dots representing the ideal drop position to create the specific mark 38. Real world CIJ marking with slow moving objects, such as a piece of paper, can look very close to this idealized grid. Faster moving objects create marks that can look skewed from the idealized grid. Another effect is that as the object moves further away from the CIJ printing nozzle, the individual drops separate rather than touch.

In some embodiments, the marker font file 170 can be used by an OCR algorithm. The marker font file 170 can also be digitally translated into a format, such as the font description file 58, that can be used by an OCR algorithm. In some embodiments, this can be done in a single step when operational details of the OCR algorithm and the marker font file 170 format are known. In other embodiments, the marker font file 170 can be digitally translated into a format that can be used by an OCR algorithm using an idealized synthetic image file 178 as an intermediary step. This intermediary step of using the synthetic image file 178 may be necessary if the OCR file format is not known, and because standard OCR algorithms allow users to "train" from images, i.e., allow the user to set the correspondence between the image region and the actual character. In other words, generate a synthetic image file 178, and then identify a region of the image as a specific character 180, such as the stylized letter 'S'.

Figure 10:
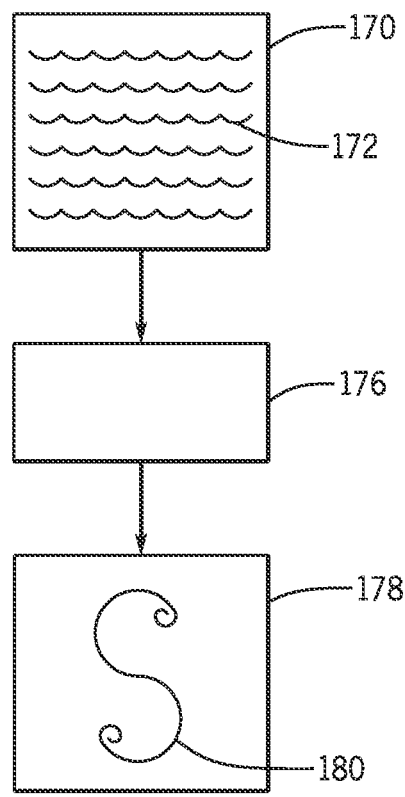
FIG. 10 is a flow chart of a method to generate a synthetic image file.

Referring to FIG. 10, an interpretation algorithm 176, the computer 56 or the processor 44 can digitally interpret the marker font file 170 to directly, or indirectly, create the synthetic image file 178 of one or more characters, for example a specific character 180 such as the stylized letter "S" of mark 38, or many characters, such as all alphanumeric characters. The interpretation algorithm 176 then knows that a specific character, e.g., the specific character 180, was rendered in a specific region of the marker font file 170. This information can then be passed to an OCR algorithm as input for the specific character 180. The synthetic image file 178 can be an electronic data file that provides an electronic data definition of an idealized character pattern of the specific character 180. The synthetic image file 178 can take the place of, or used in conjunction with, the electronic image 48 used for generating the font description file 58.

Because the marker font file 170 describes how a printer will print each specific character, for example character 180, an electronic image 48 of a character may not need to be acquired to match the image pixels of that character with that character's font description file 58. Other input or interaction may not be required to match a character in an acquired image with the individual character's font description file 58. A "golden sample" with quality marking may not need to be created for training purposes.

To train the handheld scanner 20, the font description file 58 can be uploaded to memory 52 in the handheld scanner 20. The handheld scanner 20 can then be configured to acquire an image, such as image 48, and read the font description file 58, which allows the handheld scanner 20 to scan and decode the specific character, such as character 180.

Figure 11:
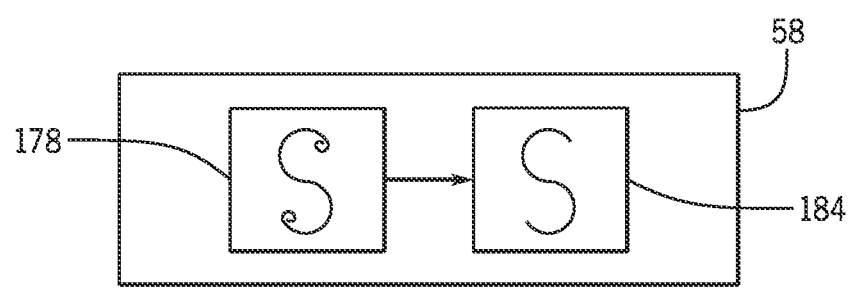
FIG. 11 is a schematic view of a font description file.

In some embodiments, the marker font file 170 can be downloaded to the memory medium 52 and stored in the handheld scanner 20, from the computer 56 for example, via the communication port 54. When a synthetic image file 178 is needed because the OCR file format is not known, the interpretation algorithm 176, can then interpret the marker font file 170 to directly, or indirectly, create the synthetic image file 178 of the specific character 180. The synthetic image file 178 can be stored in the memory medium 52 or can be uploaded to the computer 56. The font description file 58 can then be generated that associates the synthetic image file 178 with a character 184 for use during the OCR process (see FIG. 11). This configuration may allow better matching between the ideal mark and what is actually printed at run-time because the marker font file 170 can be an improved description of the physical marking process, which can then be modeled by an OCR algorithm.

For example, the CIJ dot separation and skew could be measured and an OCR font more representative of run-time characteristics can be generated. In CIJ printing, individual drops can be described in the marker font file 170, but this information may be lost when going through the intermediary step of creating the synthetic image file 178. This information could be used by the OCR algorithm to better handle cases such as when the drop/dot position increases or decreases based on part position from the ink nozzle.

A second example is the laser marker. As discussed above, the laser stroke width can be influenced by both the laser power and the properties of the material being marked. Again the OCR algorithm can better handle variation from ideal if this information is given to the OCR algorithm, as the OCR algorithm is typically configured to use this type of information.

In other embodiments, the marker font file 170 can remain on the computer 56. The computer 56 can store and use the interpretation algorithm 176, when needed, to interpret the marker font file 170 to directly, or indirectly, create the synthetic image file 178 of the specific character 180. The synthetic image file 178 can be stored on the computer 56, or the synthetic image file 178 can be downloaded to the memory medium 52 and stored in the handheld scanner 20. The font description file 58 can then be generated, either on the computer 56 or the handheld scanner 20, to associate the synthetic image file 178 of the specific character 180 with the character 184 for use during the OCR process.

Other features to translate between the marker font file 170 and the font description file 58 are explicitly contemplated. For example, it is not necessary that a marker font file 170 is used directly. For instance, an intermediate file format, such as a generic laser font description, may be used in the translation between the marker font file 170 and the font description file 58.

For some marker font files 170, the ideal marker characters may deviate from run-time mark properties. When character deviations are recognized, other attributes of run-time characters, such as scale, can be identified that would not be necessary when the train-time and run-time image are acquired via the handheld scanner 20.

Referring to FIG. 12, an alternative method 190 of training a handheld scanner 20 for OCR of a character 180 is shown. A first step can be to interpret a marker font file 170, as indicated at process block 192. Optionally, the marker font file 170 can be interpreted using an interpretation algorithm 176. The interpretation algorithm 176 can create a synthetic image file 178, as indicated at process block 194. The synthetic image file 178 can provide an electronic data definition of an idealized character pattern of a specific character, such as character 180. Optionally, at process block 198, the synthetic image file 178 can be used to generate the font description file 58. At process block 200, the font description file 58 can be stored, either on computer 56 or in memory medium 52.

Figure 13:
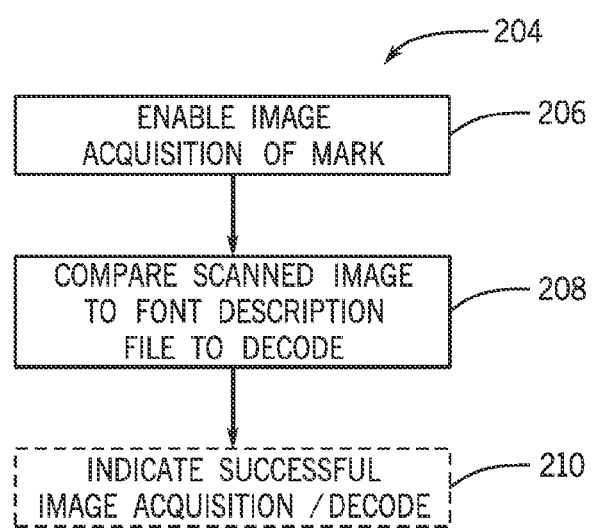
FIG. 13 is a method associated with decoding a scanned image using a font description file.

Referring to FIG. 13, a method 204 is shown for scanning a mark 38 on an object 34 using a handheld scanner 20. At process block 206, a user enables an image acquisition of the mark 38. At process block 208, the processor 44 can then attempt to decode the scanned image by comparing the scanned image to a font description file 58. Optionally, as indicated at process block 210, the handheld scanner 20 can provide an indication of a successful image acquisition and/or decode by enabling one or more feedback devices 46, 50, and/or by displaying the decoded image on a display screen 60 for the user to see. The process can then be repeated for the next image acquisition of a mark.

Although the present technology has been described with reference to preferred embodiments, workers skilled in the art will recognize that changes may be made in form and detail without departing from the spirit and scope of the technology. For example, the present technology is not limited to the embodiments of handheld scanners and associated devices shown herein and may be practiced with other scanners and cameras.

The particular embodiments disclosed above are illustrative only, as the technology may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the technology. Accordingly, the protection sought herein is as set forth in the claims below.

What is claimed is:

1. A handheld scanner comprising:
a scanner subassembly, the scanner subassembly including a vision sensor, a processor coupled to the vision sensor, and memory coupled to the processor;
a user interface coupled to the scanner subassembly, the user interface including a visual display for viewing a live image of at least a portion of a mark to be scanned, the visual display including a region of interest viewable on the visual display, the region of interest to enable a user to position the handheld scanner for optimal X-Y position of the handheld scanner;
vision software executable by the processor, the vision software operable to digitally interpret a marker font file to decode a subsequent image of the mark, the marker font file describing the mark, the vision software further operable to digitally translate the marker font file into a synthetic image file; and
an OCR algorithm configured to train the handheld scanner using the synthetic image file.

2. The handheld scanner according to claim 1:
wherein the vision software is operable to digitally associate the marker font file with desired electronic data and to generate a font description file, the font description file usable to decode the subsequent image of the mark.

3. The handheld scanner according to claim 1:
wherein the synthetic image file is stored in the memory.

4. The handheld scanner according to claim 1:
wherein the synthetic image file is digitally associated with the desired electronic data to generate a font description file.

5. The handheld scanner according to claim 1:
further including a range finder coupled to the scanner subassembly, the range finder extending from a face of the scanner subassembly a predetermined distance, the predetermined distance to provide an optimal working distance for a scan, the range finder extending off of the face of the scanner subassembly substantially parallel to an optical axis of the vision sensor.

6. The handheld scanner according to claim 1:
wherein the user interface comprises a portable data terminal.

7. The handheld scanner according to claim 1:
further including at least one of a visual feedback device and an audio feedback device to provide feedback to a user indicating the mark is within the region of interest.

8. The handheld scanner according to claim 5:
further including a light source on the scanner subassembly to provide illumination, the range finder comprising a diffusive material, and the illumination passing through the range finder diffusive material to provide diffuse illumination on the mark.

9. A handheld scanner comprising:
a scanner subassembly, the scanner subassembly including a vision sensor, a processor coupled to the vision sensor, and memory coupled to the processor;
a range finder coupled to the scanner subassembly, the range finder extending from a face of the scanner subassembly a predetermined distance, the predetermined distance to provide an optimal working distance for a scan, the range finder extending off of the face of the scanner subassembly substantially parallel to an optical axis of the vision sensor;
vision software executable by the processor, the vision software operable to digitally interpret a marker font file to decode a subsequent image of the mark, the marker font file describing the mark, the vision software further operable to digitally translate the marker font file into a synthetic image file; and
an OCR algorithm configured to train the handheld scanner using the synthetic image file.

10. The handheld scanner according to claim 9:
wherein the vision software is operable to digitally associate the marker font file with desired electronic data and to generate a font description file, the font description file usable to decode the subsequent image of the mark.

11. The handheld scanner according to claim 9:
wherein the synthetic image file is stored in the memory.

12. The handheld scanner according to claim 9:
wherein the synthetic image file is digitally associated with the desired electronic data to generate a font description file.

13. The handheld scanner according to claim 9:
further including a user interface coupled to the scanner subassembly, the user interface including a visual display for viewing a live image of at least a portion of a mark to be scanned, the visual display including a region of interest viewable on the visual display, the region of interest to enable a user to position the handheld scanner for optimal X-Y position of the handheld scanner.

14. The handheld scanner according to claim 9:
further including a constant focus lens assembly to provide a substantially constant magnification for a predetermined range of working distances.

15. The handheld scanner according to claim 9:
further including a measurement device, the measurement device to determine a distance to the mark, the processor using the distance to the mark for a scale determination.

16. The handheld scanner according to claim 9:
further including a computer coupled to the scanner subassembly, the computer including vision software operable to download the electronic image of the mark, associate the electronic image of the mark with desired electronic data, and to generate a font description file of the associated mark; and
the computer operable to upload the font description file to the handheld scanner subassembly, the font description file usable by the processor to decode a subsequent image of the mark.

17. A handheld scanner comprising:
a scanner subassembly, the scanner subassembly including a vision sensor, a processor coupled to the vision sensor, and memory coupled to the processor;
a user interface coupled to the scanner subassembly, the user interface including a visual display for viewing a live image of at least a portion of a mark to be scanned, the visual display including a region of interest viewable on the visual display, the region of interest to enable a user to position the handheld scanner for optimal X-Y position of the handheld scanner;
a range finder coupled to the handheld scanner subassembly, the range finder extending from a face of the scanner subassembly a predetermined distance, the predetermined distance to provide an optimal working distance for a scan, the range finder extending from the face of the scanner subassembly substantially parallel to an optical axis of the vision sensor;
vision software executable by the processor, the vision software operable to digitally interpret a marker font file to decode a subsequent image of the mark, the marker font file describing the mark, the vision software further operable to digitally translate the marker font file into a synthetic image file; and
an OCR algorithm configured to train the handheld scanner using the synthetic image file.

18. The handheld scanner according to claim 17:
wherein the vision software is operable to digitally associate the marker font file with desired electronic data and to generate a font description file, the font description file usable to decode the subsequent image of the mark.

19. The handheld scanner according to claim 17:
wherein the synthetic image file is stored in the memory.

20. The handheld scanner according to claim 17:
wherein the synthetic image file is digitally associated with the desired electronic data to generate a font description file.

21. The handheld scanner according to claim 17:
wherein the range finder comprises a plurality of fingers extending from a base, the base coupled to the handheld scanner subassembly.

22. A method for scanning a mark on an object, the method comprising:
providing a handheld scanner, the handheld scanner including a vision sensor, a processor coupled to the vision sensor, memory coupled to the processor, a user interface and a range finder;
enabling a visual display on the user interface, the visual display for viewing a live image of at least a portion of the mark;
observing the visual display while moving the handheld scanner so the visual display displays the live image of the at least a portion of the mark;
positioning the live image of the at least a portion of the mark near to or within a region of interest viewable on the visual display for alignment feedback;
positioning the handheld scanner so a distal end of the range finder touches or is substantially near the object;
digitally executing the vision software for interpreting a marker font file, for digitally translating the marker font file into a synthetic image file, and for decoding a subsequent image of the mark, the marker font file describing the mark; and
training the handheld scanner using an OCR algorithm and the synthetic image file.

* * * * *